United States Patent [19]

Grossmann et al.

[11] 3,906,151

[45] Sept. 16, 1975

[54] METHOD AND APPARATUS OF SIGNAL CONVERSION IN PROGRAM-CONTROLLED AUTOMATIC DATA EXCHANGES

[75] Inventors: Günter Grossmann; Peter Kern; Karl-Heinz Kotter; Bernhard Schaffer; Lothar Schmid, all of Munich; Arnulf Thilenius, Frieding; Peter Weidner, Munich, all of Germany

[73] Assignee: Siemens Aktiengesellschaft, Berlin & Munich, Germany

[22] Filed: Apr. 20, 1973

[21] Appl. No.: 353,012

[30] Foreign Application Priority Data

May 31, 1972 Germany ............................ 2226626

[52] U.S. Cl. ...................... 178/3; 340/172.5; 444/1

[51] Int. Cl.² .......................................... H04L 11/00

[58] Field of Search ........... 178/3, 26 A; 179/18 ES; 340/172.5

[56] References Cited

UNITED STATES PATENTS

| | | | |
|---|---|---|---|
| 3,717,723 | 2/1973 | Jaskulke et al. | 178/3 |
| 3,760,364 | 9/1973 | Yamauchi et al. | 340/172.5 |
| 3,768,079 | 10/1973 | Bittermann et al. | 340/172.5 |

*Primary Examiner*—Thomas W. Brown

[57] ABSTRACT

A method and apparatus for converting characters in a program-controlled data exchange installation is described. The exchange installation includes at least one common storage unit storing data and programs and processing units inter-operating with the storage unit in a cyclic manner. At least one of the processing units is a program control unit, and at least one is a line termination unit. An additional character handling unit is provided for carrying out character translation. The latter apparatus includes a connecting device regulating the traffic with the common storage, a control section controlling the operations for the various tasks to be performed and a storage section. The latter storage section forms a channel storage, which is divided into separate channel storage areas, each containing a series of channel locations. At the start of a character handling operation initiated by the program control, the channel locations are selectively allocated for the duration of a character handling operation, by entering a corresponding line number of the access line determined by the line number. In order for the character handling unit to receive instructions and data in the channel storage and to transfer message and data from the channel storage it gains cyclic access to specified areas in the common storage which are provided for the reception of instructions, messages and data.

8 Claims, 10 Drawing Figures

METHOD AND APPARATUS OF SIGNAL CONVERSION IN PROGRAM-CONTROLLED AUTOMATIC DATA EXCHANGES

BACKGROUND OF THE INVENTION

The invention relates to a method of converting signals in an automatic data exchange having at least one common storage holding the data required for the operation of the system and programs and having processing units interoperating cyclically therewith. At least one of the processing units operates as a line termination unit and at least one as a program control unit.

For the operation of program-controlled data exchanges it is well known in the art, for purposes of transmitting messages between the incoming and the outgoing lines, to take the assignments between incoming offering lines and outgoing sending lines from a common storage. The storage also holds the necessary data and programs for the operation of the switching system. Aside from the processing unit available for connecting the incoming and the outgoing lines, called the line termination unit and described in detail in commonly assigned U.S. Pat. No. 3,717,723, and the common storage, there is further provided a processing unit for coordinating the operation functions, hereinafter referred to as the program control unit. In this type of data system, the individual processing units are connected to the common storage over a standard interface assigned to a series of control and information channels. Thus it is possible to expand the system in a simple manner by connecting further processing units, thereby adapting itself to varying conditions. The data communication between the individual processing units and the common storage occurs cyclically over communication paths from and to the common storage.

FIG. 1 shows the fundamental construction of such a prior art system, wherein two processing units VE1 and VE2 are provided, one being a line termination unit LE and the other a program control unit PE. The line termination unit LE contains for each line connected to the system, i.e., for one incoming line and one outgoing line a termination in which the condition of the line connected thereto is continuously supervised and from which, if a polarity reversal occurs on the line, a request is transmitted to the common part of the system. It further includes code converters shared by all terminations, over which each termination is identified in accordance with its line number. On the basis of the address thereby generated, it is possible to reach within a storage area, called feeder cell block, a feeder cell assigned to each line, which feeder cell is reached by an address formed in the line connection unit LE by the number of, a very specific line. The construction and functioning of the line termination unit LE is described in detail in U.S. Pat. No. 3,717,723.

The program control unit PE is used to execute the instructions of the program. As is well known from data processing technology, it comprises a multiplicity of registers and logic circuits. The program control unit PE receives from a cammand block forming a further storage area within a central storage the individual instructions of a program and executes the necessary operations in accordance with the operation part of the instructions. During the execution of an instruction, data may also be exchanged with the central storage. Details of the construction and operation of such a program control unit are given in U.S. Pat. No. 3,710,029.

Both the line termination unit and the program control unit are each connected to an information input INFE, or to an information output INFA of a control device SEAS (i.e., the storage input/output control of the central storage) over the information channels a. From there, access is gained to the central storage SP over the continuing information channels. The control signals sent from the individual processing units or to the individual processing units to be transferred are transmitted over the control channels marked *b*. Each information channel *a* and each control channel *b* is provided with a plurality of parallel wires.

The control device SEAS is represented by the connecting link between the processing units and the common storage SP. It is the function of the control device SEAS to process the cycle requests of the individual processing units VE according to an order of preference, i.e., to control the access to the common storage. Details of such a control unit are found in U.S. Pat. No. 3,711,835.

Data traffic occurs in a manner such that the processing units transmit their requests for allocation of a storage cycle in the form of a request signal to the control device SEAS in conjunction with formation on an address in the common storage SP in the form of what is known as a storage word address over the control channel *b*. On the basis of internal criteria, a selection is made therein whereby, among other things, the order of preference of the requesting processing unit is taken into consideration. The addressed storage block is reached over the continuing control channel *b*. With the storage cycle allotted to this request, an information path is extended to its final destination over the information channel *a*.

For all tasks to be performed in a switching system, the progragm control PE interacts closely with the common storage holding the corresponding data and programs. Above all, this is the case during the call setup and call termination, so as to identify, for example, an incoming polarity reversal as a call criterion and to trigger certain program in dependence thereupon. Dial signals coming in immediately afterwards must also be evaluated in a prescribed manner, which again takes place through program operations triggered selectively. The determination how a unit of information coming in over an access line shall be handled, i.e., what program flow shall be executed with respect to this line, may be carried out in accordance with the method described in commonly assigned, allowed U.S. application Ser. No. 229,078, filed Feb. 24, 1972 now U.S. Pat. No. 3,786,079 in that criteria are written into the feeder cell in the central storage permanently allocated to the incoming line following each operating sequence in the system. These criteria are read and evaluated with each new selection of said feeder cell. Some of these criteria will be evaluated as start signals for the program control unit PE to execute an internal processing. The instructions for such an internal processing operation will be read out of a further block within the central store, which block is referred to as a command block.

The intensity of traffic carried in a system operating according to the above principle is particularly great, if the data coming in over the incoming lines are transmitted, not only to an outgoing line, for example after establishing a connection but must also be subjected to internal processing, for example, to establish a connection between incoming and outgoing lines. A very frequent form of such internal processing is character translation, for example for the dial code evaluation, to convert data bits received serially into one or more parallel characters. Also, after a processing task characters in parallel form must again be transmitted in serial form. A character conversion is not only necessary for a dial code evaluation, but it also constitutes a fundamental prerequisite for the operation of the system as a message switching center. All of these internal processes must be executed by the program control unit PE, and this places on the system a very high requirement for storage cycles.

An object of the invention is to provide a data switching system, of the type discussed hereinabove, capable of operating to reduce the system loads caused by the execution of high repetitive character conversion operation.

SUMMARY OF THE INVENTION

According to the invention, the foregoing and other objects are achieved in that the signal, e.g. character, conversion is carried out centrally for all connected lines in an additional character device in which there are a connector regulating the traffic with the common storage, a control section controlling the operations of the tasks to be performed in the character handling unit and a channel storage available as an additional storage. The channel storage is divided into individual channel storage areas, each containing a series of channel locations (cells) which can selectively be allocated at the beginning of a character handling process initiated by the program control unit, by entering a corresponding line number of the access line determined by said line number for the duration of a character handling process. The character handling unit, for the reception of instructions and data into the channel storage and for transferring messages and data from the channel storage, gains cyclic access to given locations in the central storage provided for receiving instructions, messages and data.

The allocation can be effected such that a given channel location in the channel storage of the character handling unit is addressed by the program control unit which, in this case, takes over the control of the channel locations. However, it is also possible that this allocation is carried out by the character handling unit itself, in which case the character handling unit itself searches for and seizes a free channel location. In both cases, the number of the requesting access line is entered in the channel location. Conversely, the number of the channel location so assigned for the duration of a conversion is entered in the feeder cell in the central store, which location is permanently allocated to the corresponding access line. If the allocation of the channel locations is taken over by the program control unit, the latter records the corresponding channel number in the feeder cell assigned to the access line. At the same time, the list of the available channel locations is corrected accordingly. If the allocation is carried out by the character handling unit itself, the latter transfers the channel number to the program control unit, which makes the entry in the feeder cell.

One advantage of the invention is that all the channel locations, i.e., a multiplicity of conversion possiblities, can be controlled by a single control section. As a result of the selective allocation of the channel locations to the acess lines, which request the cooperation of the character handling unit, there is the additional advantage that the channel storage must only have a size determined by the probable volume of traffic carried. The number of channel locations to be provided is, therefore, substantially smaller than the number of the access lines, since one may proceed from the assumption that a character conversion operation is to be carried out for only a portion of the access lines at a time.

Due to the division of the channel storage into channel locations and to the selective allocation thereof, there is the advantage that the allocation can be adapated to, for example, the modulation rate or to the code on the access lines.

Since the character handling unit according to the invention interoperates in the same manner with the common storage of the system as any other processing unit, i.e., it is also connected therewith over the information and control channels of the standard interface, it results in the additional benefit that no particular advance commitments need be made for the connection of the character handling unit. If the entire system is of modular construction, there is the additional advantage that if the character handling unit breaks down, the program control unit available in the system can take over the tasks of the character handling unit, so that the latter need not be duplicated. Although this means a loss of power, the failure of the character handling unit does not lead to the breakdown of the whole system.

The character handling unit communicates with the common storage cyclically. It can gain access to the common storage for the reception of an instruction from the common storage, for the transfer of a message to said storage, and for the reception or transfer of data in the form of whole characters (known as character transfer), in the course of an instruction cycle, of a storage cycle running as an indicator cycle and of a storage cycle running as a transfer cycle. Furthermore, there is the possibility that the character handling unit reads jointly polarity reversals coming over a line connected to the line termination unit and are entered in the incoming location in the common storage allocated to this line in the form of polarity reversal instructions. Conversely, the character handling unit offers the possiblity of independently transmitting bits in the form of polarity reversal signals over the line termination unit and the access line.

The character handling unit receives instructions during an instruction cycle from an instruction area of the common storage, into which the program control unit enters the instructions. Messages are written into a record area of common storage from the character handling unit with a record cycle, which is processed by the program control unit. The character transfer running with a transfer cycle may take place both in the direction of the comon storage. In the first instance, a complete character is written into a given channel location, in the second instance it is written into a given area of the common storage. Thus, the possibility is offered that in a specified area of the common storage to be processed by the program control unit the characters are available in parallel form. Conversely, characters which are available in parallel form in the storage are transferred character-by-character to the character handling unit and transmitted serially from there.

The reception of polarity reversal instructions and the delivery of polarity reversal messages also take place over the common storage which, for this purpose, contains a second instruction area and a second record area. Polarity reversal instructions are entered into the second instruction area from the line termination unit while the character handling unit enters polarity reversal signals into the second record area which is processed by the line termination unit. This takes place such that concurrently with the entry of a polarity reversal caused by a start signal of a character to be converted a polarity reversal instruction is entered in the instruction area and is received by the character handling unit during an instruction cycle. At the same time, a counter is activated therein, which causes, at the expected pulse center of the character, a cycle request originating with the character handling unit, so that with the allotted cycle access is gained to the incoming cell in the common storage determined in accordance with the allocation between a channel location and an access line. Thus, the polarity of the access line which is entered in the incoming cell is sampled in the termination, and each change is received by the channel location. In this way, the whole character is built up in the channel location. It can be entered in the area of the common storage provided therefor in the course of a transfer cycle. During the transmission of polarity reversals, a polarity reversal signal in the second record area is entered with each pulse, which is processed by the line termination unit, in which record area the polarity on the corresponding access line is changed.

According to an advantageous further development within the scope of the invention, it is proposed to provide between the character handling unit and the line termination unit a cross-connection, over which the control signals and data can be exchanged. This is of particular advantage for the reception of polarity reversal instructions and for the transfer of polarity reversal signals, since now the second instruction area referenced hereinabove and the second record area in the common storage are no longer needed. In this case, the reception of polarity reversal instructions takes place such that the character handling unit is offered each polarity change entered in an incoming cell of the common storage. A read-for-control process of the offering cell is executed in the character handling unit, by evaluating an additional read-for-control criterion coming in over the cross-connection. In the course of the latter process the polarity change in the incoming cell is received as a polarity change instruction. Polarity reversal signals, by which the transmission of polarity reversals is caused over the access line can directly be transferred to the line termination unit over the cross-connection.

As explained in more detail hereinbelow, the data handling unit involves a process which is to be performed very frequently, namely a series/parallel conversions, if there is data signal reception, and a parallel/series conversion if there is data signal transmission, in accordance with the invention this process can be executed without additional storage cycles, and a substantial number of cycles can, therefore, be saved.

BRIEF DESCRIPTION OF THE DRAWINGS

The principles of the invention will be readily understood by reference to the description of a preferred form for its execution described hereinbelow in conjunction with the accompanying drawings, wherein.

DETAILED DESCRIPTION OF THE DRAWINGS

Figure 1:
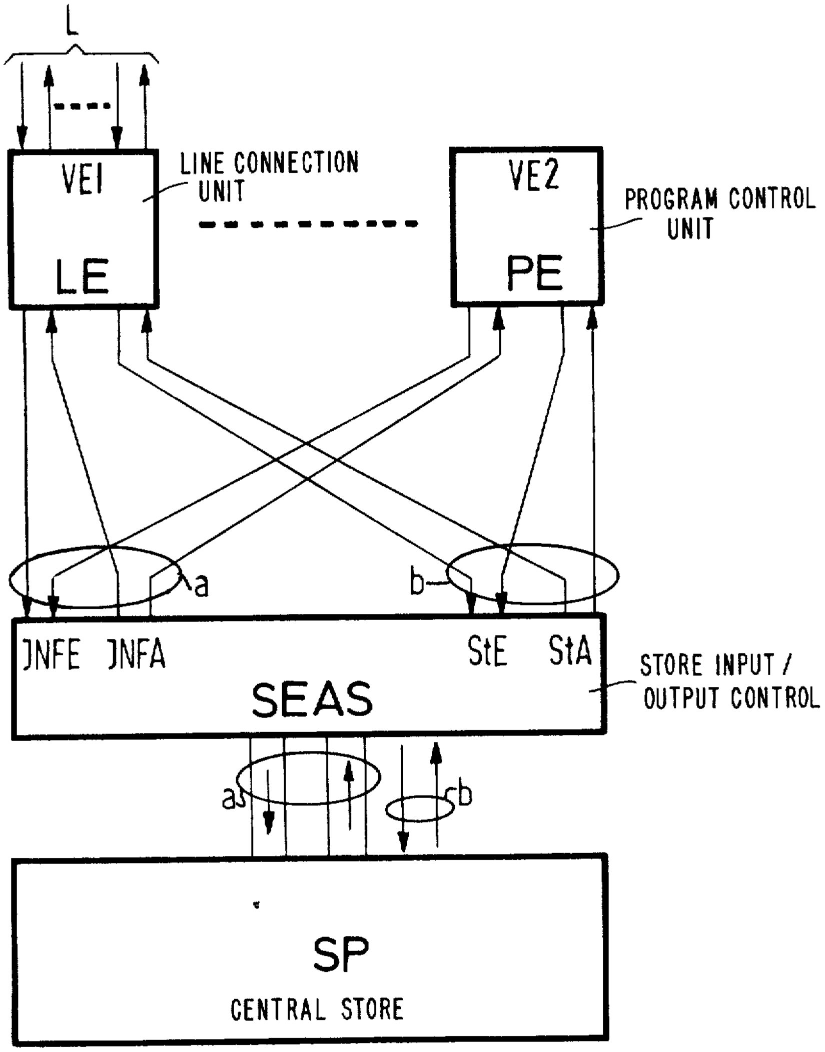
FIG. 1 is a schematic-block diagram of a prior art program controlled data exchange installation of the type used in conjunction with the invention described herein.
Figure 2:
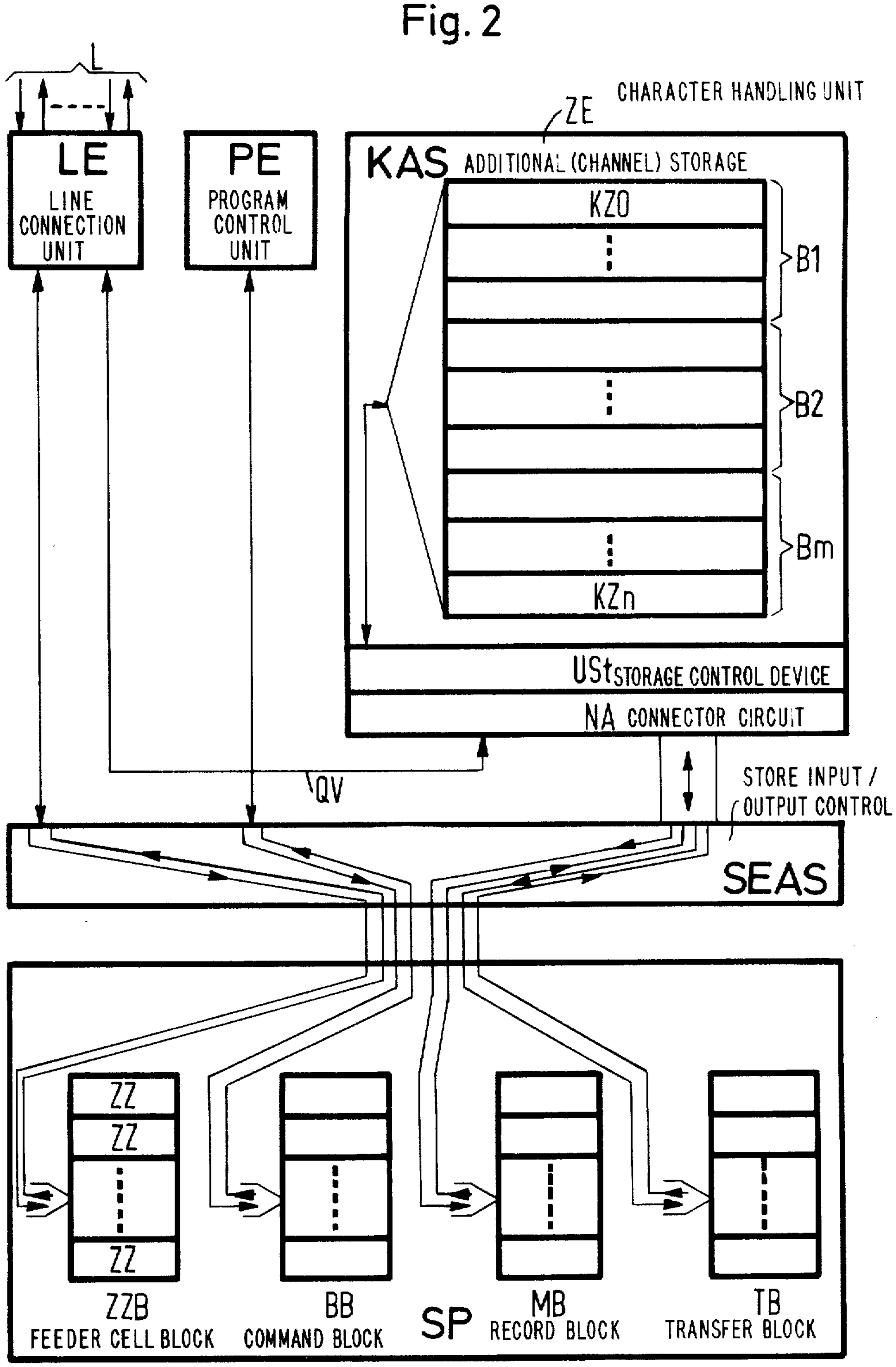
FIG. 2 is a more detailed schematic-block diagram of the FIG. 1 system having a character handling unit, in accordance with the invention, wherein the character handling unit is provided with a directly addressable storage.

FIG. 2 shows the components of the character handling unit ZE and the areas in the common storage SP needed for understanding the invention. It should be noted that those components referenced in this figure with designations like those in FIG. 1 are of like constructions. It is apparent from this figure that the character handling unit interoperates with the common storage SP over the storage input/output control SEAS in the same manner as other processing units of the system, of which the line termination unit LE and the program control unit PE are shown herein. The character handling unit ZE comprises the connector circuit NA, the control section USt and, as a storage section, the channel storage KAS.

The connector circuit NA essentially regulates the traffic between the character handling unit ZE and the common storage SP. The circuit is described in greater detail below in connection with FIG. 3. In the process, instructions or messages are received and transferred both from the storage SP and from the control section USt. The transfer of data is, likewise, processed therethrough. The connector NA has direct access to the line termination unit LE over the cross-connection QV, so as to be able to carry out the reading-for-control of polarity reversals, through the reception of polarity reversal instructions by the character handling unit, and to facilitate the transmission of polarity reversals through the transfer of polarity reversal messages for the purpose of saving operating cycles.

In the control USt, of the character handling unit, which will be explained more in detail later in connection with FIG. 4, the actual processing operations, i.e., the serial/parallel/series conversions are controlled. Essentially, the matter at issue is the process with which a certain channel location is selected, and the manner in which it is processed.

The channel storage KAS, which is a directly addressable storage in this embodiment, contains individual storage locations B1, B2 to Bm, each having a specified number of channel locations KZ. The channel locations of a storage block are each allocated to access lines capable of accommodating a given bit rate. Thus, for example, areas can be produced for rates of 50 auds, 200 bauds and 2.4 kilobauds. The limits of said .reas need, however, not be fixed in advance, but can ›e changed through program control.

Before the start of the actual character conversion, . free channel location is determined and seized by valuating the characteristic data of the access line uch as rate, code, etc., whereby the above possibilities ›f an allocation controlled by the program contol unit ›E or the possibilities of a selection carried out inde›endently by the character handling unit ZE, are afɔrded. Both possibilities offered the advantage that the llocation of a channel location to a given access line onnected to the line termination unit LE, be it an inoming line or an outgoing line, is variable. The allocaion occurs such that the line number of the line is entered in a channel location, for which a conversion is o take place. The channel location number is, likewise, ntered in the feeder cell of this line. The allocation is naintained only for the duration of a processing operaion, so that the channel location can be allocated to .nother access line after completion of the processing, .e., after completion of the conversion procedure.

The activity in the character handling unit ZE is trig;ered from the program control unit PE of the system, vhenever a position is attained therein, in the course of ι program to be executed, which postion renders neceary the cooperation of the character handling unit. To ıchieve this purpose, an instruction is entered for the :haracter conversion in an instruction area BB of comnon storage SP provided therefor. This instruction :ontains, in addition to the information identifying in ıccess line the conversion takes place, other data, e.g., f a parallel or serial conversion shall taken place in :haracters or in blocks. At the same time, a special reլuest bit, hereinafter referred to as AB bit, is set by the ›rogram control unit PE, in a section of the controller ›f the common storage SP (not shown), which is evaluıted by the character handling unit ZE through the reլuest of an instruction cycle. The setting and evaluaion of a request bit is, for example, described in ;reater detail in commonly assigned, U.S. application ;er. No. 151,448 filed June 9, 1971, now U.S. Pat. No 3,813,648.

If the allocation is carried out by the program control ınit PE, the instruction word also contains, as further nformation, the channel number of an idle channel lo:ation. The instruction area BB in the common storage ;P is read by the connector circuit NA, location by lo:ation for the purpose of receiving the instruction, vhereby the block address of the instruction area in the :onnector NA is permanently wired and the sequence inks of the instruction area locations are formed by a :ounter, hereinafter referred to as an instruction :ounter, in the connector NA. After reception by the .pecified channel location, a unit of information is ıvailable in the character handling unit ZE indicating he kind of character.

After a processing task is completed, a message can ›e provided which is again transferred to the common .torage SP over the connector circuit NA and entered n the record area MB. Here, too, the block address of he record area is available as a permanently wired adlress for the addressing thereof, while the sequence ink is formed by the position of a counter, hereinafter eferred to as a record counter. It is of advantage to set ι special criterion in the form of the AB bit, reference ıereinafter, for the program control unit PE processing the record area, whenever a unit of information available therein, and not yet considered by the program control unit PE, would be overwritten, i.e., destroyed. The completion of the processing of this area, which normally runs in cycles, is then interrupted, and the location in question is processed immediately. Both the reception of an instruction and the transfer of a message takes place within the storage cycle (instruction of record cycle).

In addition to the reception of instructions and the transfer of messages, the character transfer, referenced above, takes place within the transfer cycles. In the course of the character transfer the character handling unit receives or transfers whole characters from a transfer area TB of the common storage SP. The character transfer, as well as the possibility of reading-for-control in the character handling unit of the polarity reversal instructions delivered to the line termination unit by the common storage, upon the transfer of polarity reversal, and the polarity reversal signals delivered by the control section USt, which polarity reversal signals cause the transmission of a polarity reversal on a given access line, will be described hereinbelow with reference to the connector circuit (FIG. 3), the control section (FIG. 7), and the corresponding flow charts (FIGS. 4, 5, 6, 8 and 9).

Figure 3:
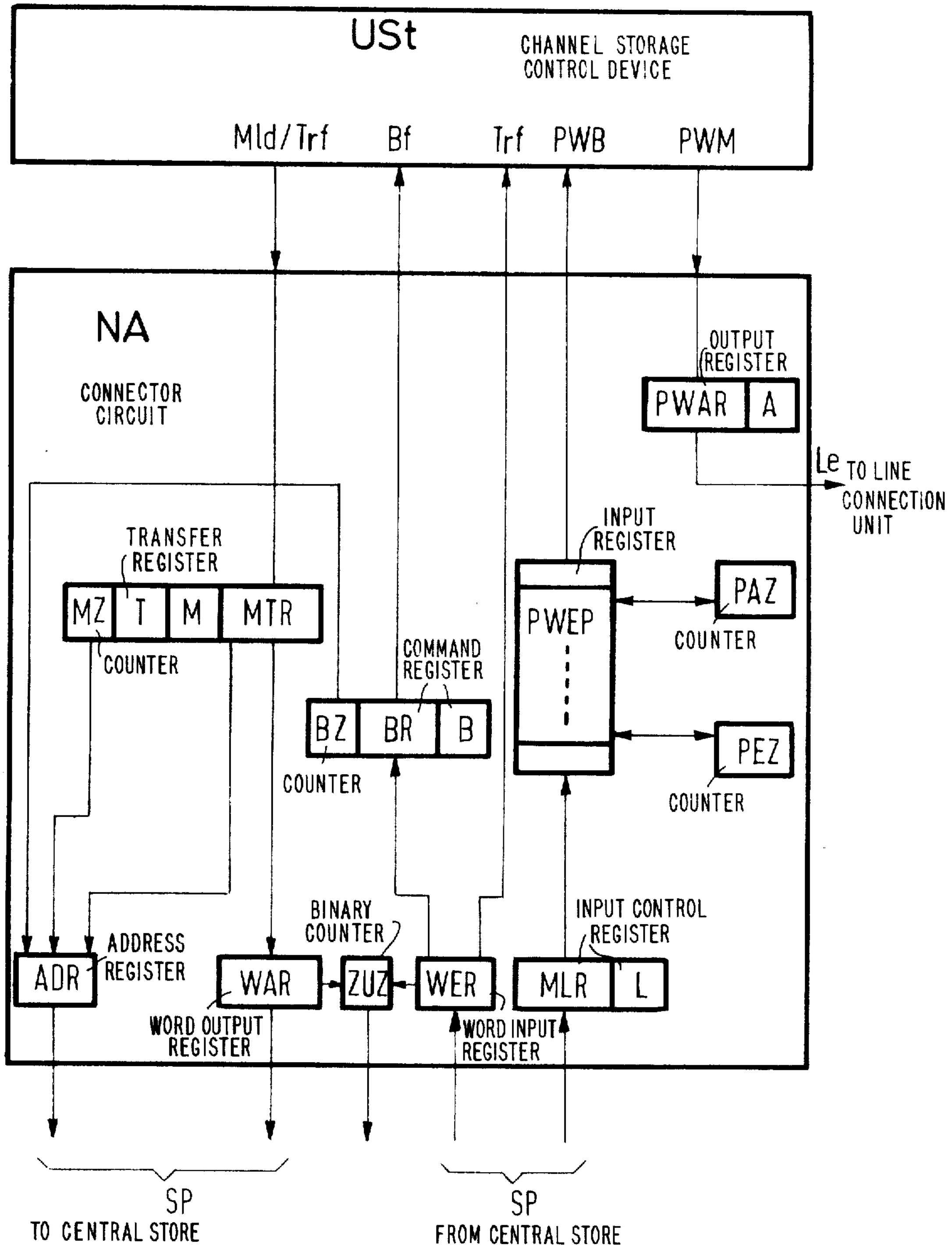
FIG. 3 is a more detailed block-schematic view of the connector circuit portion of the FIG. 2 embodiment of the character handling unit.

FIG. 3 shows those details of the construction of the connector NA needed for understanding the invention.

An instruction register BR, which can be reached over a word input register WER, is provided in the connector circuit NA for receiving the incoming instructions resulting from the interrogation of the instruction area BB in the common storage SP, and a read-for-control register MLR is provided for receiving polarity reversals to be read-for-control of the polarity reversal instructions. Whereas the instruction register BR is connected directly at its output with the control section USt of the character handling unit, data received in the read-for-control MLR are stored intermediately in an input register PWEP, for the control of which the two counters PEZ and PAZ are provided. A marking list is set with each of a unit of information in the instruction register BR or read-for-control register MLR. The units required therefor are marked L as part of the registers under consideration in FIG. 3. It should be noted that each of the registers discussed herein are conventional binary registers.

An address register ADR and a word output register WAR are provided for transferring a unit of information from the connector circuit NA to the common storage SP. The instruction counter BZ is available for addressing the individual locations in the instruction area BB, from which the instructions are received, and the record counter MZ is provided for addressing the individual locations in the record area MB, into which a message is to be entered. The record information itself is applied by the control section USt to a record and transfer register MTR, which also serves for receiving the characters to be transmitted during a transfer procedure. In this case, the address for the transfer area TB in the common storage SB is also supplied by the control section USt, identified in the register MTR, and introduced to the address register ADR. Devices M and T, which can be conventional bistable stages, are allocated to the register MTR to characterize messages or transfer data to be transmitted. In these devices a marking bit is set, by switching stages, whenever a message or a unit of transfer information to be sent is present.

Since for the execution of certain instructions in the character handling unit a series of storage cycles are required, whereas the processing by the control section USt takes place in cycles, no unlimited waiting periods may occur between the request and the assignment of a storage cycle. Therefore, a monitor is provided in the connector NA having the form of a binary counter ZUZ which is counted upwards during the time interval between a cycle request and a cycle assignment. If a preset value is exceeded, a cycle request with the highest degree of perference is sent. At the output of the cross-connection QV to the line termination unit, the connector NA comprises an output register PWAR, over which polarity reversal messages can be relayed to the line termination unit LE. Switching stage A is allocated to this register also, in which a marking bit is set if a polarity reversal is to be transmitted.

Figure 4:
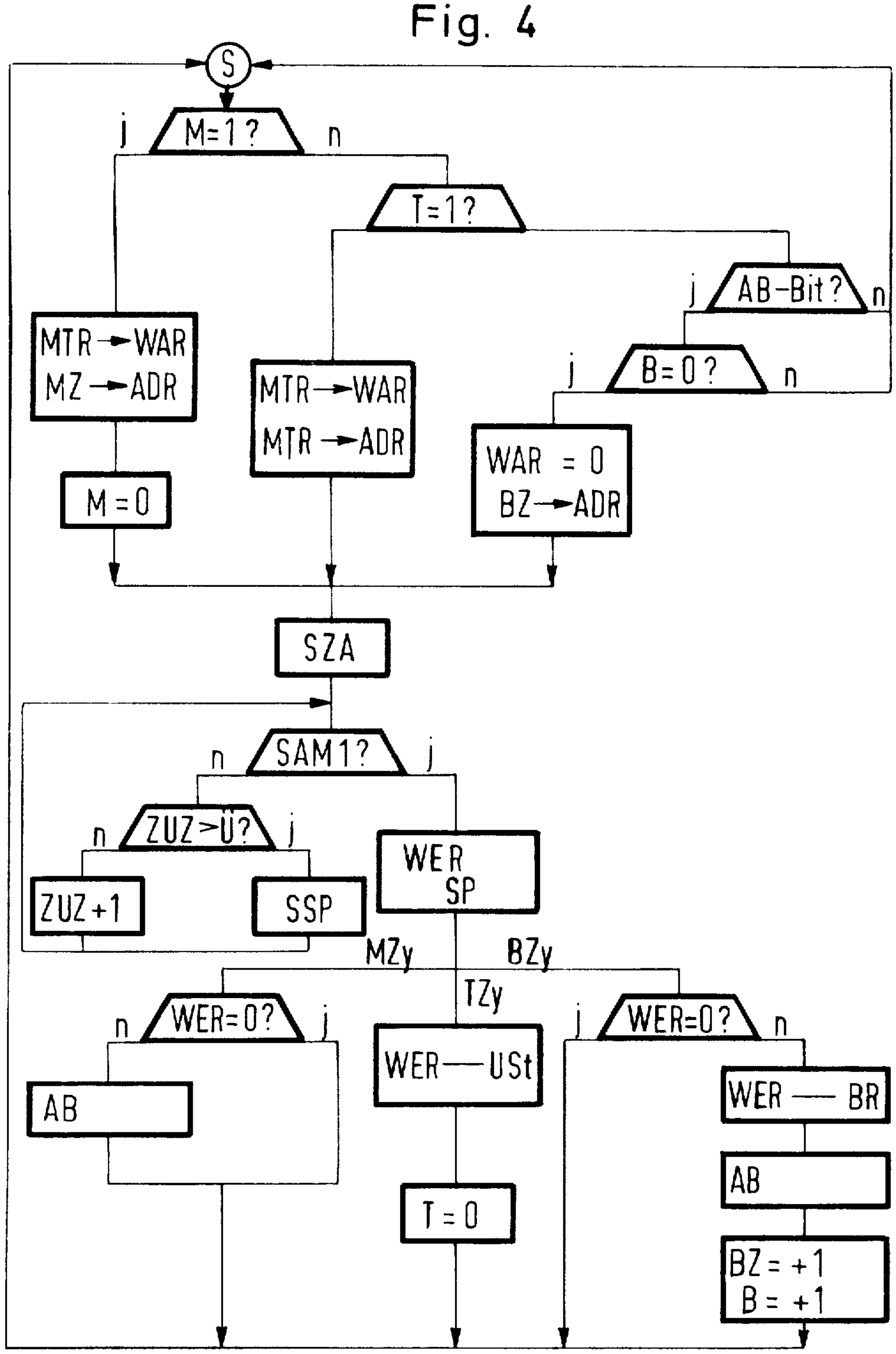
FIGS. 4 through 6 are flow charts illustrating the operations of the connector circuit illustrated in FIG. 3.

FIG. 4 shows in the form of a flow diagram the logic operations in connector circuit NA. If neither a message is to be provided, nor a character transfer to be executed, neither of the marking bits M and T are set, (M=0, T=0). If, in addition, the instruction area BB in the common storage SP does not hold an instruction for the character handling unit, then no request bit is set (AB=0), and neither is marking bit set (B=0), In this case, no cycles are processed by the connector NA. Instead, the latter is only activated by a set marking bit or by a request bit (AB=1). Whereas the AB bit is set from the program control unit, the marking bits M and T are set through the control section USt. A message is present, if the marking bit is set (M=0). The information held in the record transfer register MTR is received by the word output register WAR.

At the same time, the address, i.e., the position of the record counter MZ, is applied to the address register ADR, the marking bit is erased, and a cycle request SZA is coupled to the common storage SP. The transfer of the message to the common storage can take place within a record cycle whenever the area MB in the common storage is capable of reception. This is the case, if the word input register WER in the connector circuit NA has not been written into. However, if that was not the case, there is a risk that with the transfer of the message a unit of information held in the particular location of the area MB is overwritten and, hence, destroyed. Therefore, as pointed out above, an AB bit is set by the character handling unit which causes the immediate processing of the particular record area MB in the common storage through control unit (not described herein).

After the transfer of the message, or if no message was present (M=0), it is determined if a character transfer is to be executed. In this case, the marking bit T is set (T=1). The result is that the content of the and transfer register MTR is applied both to the word output register WAR and, if it concerns the address information, to the address register ADR. Immediately afterwards, the cycle request SZA for a transfer cycle TZy is made. In the course of a transfer cycle, a character can be transferred from the character handling unit to the common storage, as well as from the common storage to the character handling unit. In the first instance, the character to be transferred is applied to the record transfer register MTR and transferred with the transfer cycle to the area TB in the common storage SP. In the second instance, the character to be transferred from the area TB to the character handling unit is received by the word input register WER of the connector NA and made available from there from the control section USt. To conclude these activities, the marking bit T is erased in both cases.

In connection with the transfer of a unit of a unit transfer information, the monitoring process referenced hereinabove is of importance. The cycle monitoring counter ZUZ, which is started upon the initiation of a storage cycle request and which is adjusted to a given maximum or overflow value U counts time units in which it is increased by 1 each time until the arrival of the storage output message. If the overrrun value U is reached, a special priority SSP is supplied with which the highest priority in the common storage is requested for the character handling unit ZE. Since in this way the next following storage cycle is allotted, it is insured that no further delays will occur from this point onwards.

If this operation is completed, or if neither a message nor a character transfer is present, it is verified whether there is an instruction for the character handling unit ZE in the instruction area of the common storage. That is the case if an AB bit is set for the character handling unit. In that case, if the instruction register is free (B=0), i.e., if a previously received instruction has already been received and processed by the control section USt, the word output register WAR in the connector circuit NA is placed in the "empty" condition, i.e., set to 0, and the permenently wired block address for the instruction area BB in the central storage, in which instructions are entered, and the position of the instruction counter BZ are written into the address register ADR as address for the relevant storage location in this area. Immediately thereafter, a storage cycle SZA is requested, which is to be considered as instruction cycle BZy. In the course of this instruction cycle the information received from the relevant location of the instruction area BB in the central storage is received by the word input register WER of the connector circuit NA. if this information is 0 (WER=0If the operation at this point of the connector NA is already completed. Otherwise, the content of the word input register WER is received by the instruction register BR, the AB bit is erased and the instruction counter BZ increased by 1, so that the remaining locations of the area BB are read. The control section USt is caused to execute the instruction by means of the instruction marking bit (B=1) set with the transfer of instruction. By means of the instructions, all the activities of the character handling unit ZE are controlled by the program over the program control unit PE. Thus, these instructions contain data as to what activities the character handling unit ZE has to execute as a whole or as parts thereof, for example, as conversion channels.

In this record, it is to be noted that the connector circuit NA processes instruction and record cycles independently of the control section USt. This means that instructions are entered in the instruction register BR and messages are released from the record register MTR without direct participation of the control section USt. However, during the processing of a transfer cycle the control section USt interoperates with the connector NA. This means that when a data transfer is operated, the control section and the connector circuit do not perform other processing operations, until the entire character transfer cycle, including the storage cycles required therefor, is completed.

Figure 5:
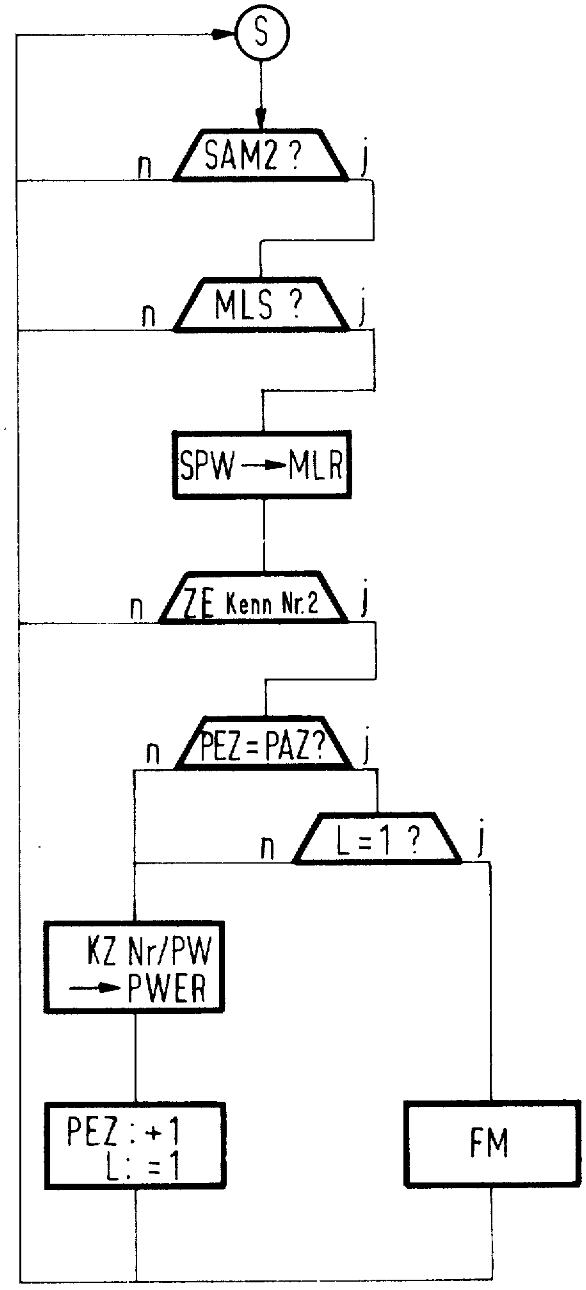
Figure 6:
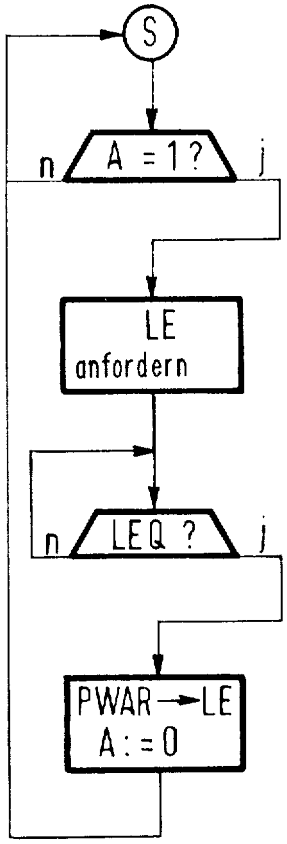

Aside from the operations described hereinabove, namely the transfer of messages to the record area MB or the reception of instructions from the instruction area BB of the common storage SP and the execution of character transfer, the character handling unit ZE can transmit as well as receive polarity reversals. Since this involves the most frequent activity, i.e., the series/-parallel or the parallel/series conversion, both operations will be explained with reference to flow diagrams. FIG. 5 illustrates the operations occuring for polarity reversal reception. FIG. 6 illustrates operations occuring upon polarity reversal transmission, i.e., the activity caused by a polarity reversal message.

While the operations described hereinabove always takes place within the scope of the interoperation between the common storage and the character handling unit, whereby all data are entered in the corresponding registers of the connector NA, or read out therefrom and entered in the corresponding areas of the common storage, it is of advantage, for purposes of saving cycles, to have the polarity reversal reception (SPU) or the polarity reversal transmission (PSU) occur over the cross-connection.

In the course of a polarity reversal change on an access line, the storage output messages released by the common storage to the line termination unit are also sent to the character handling unit. If the line termination unit performs a cycle for an access line, a check is carried out on the basis of the content of the offering cell to determine whether a channel location in the character handling unit is allocated to his access line. Only in this case is the entry of a polarity reversal instruction in the channel location necessary. In the course of a polarity reversal transmission, polarity reversal messages going out from the control section USt of the character handing unit are transferred to the common storage and/or the line termination unit, where they cause the transmission of a polarity reversal over the particular access line.

FIG. 5 shows the flow diagram for polarity reversal reception. This process, also referred to as the read-for-control operation, is initiated by a storage output message SAM2 originating with the common storage SP. The latter signal is triggered whenever the common storage communicates with the line termination unit LE. Since such communications are not established only when the polarity on a line is to be interrogated, it is necessary to have available a criterion in the connector circuit NA, which makes sure that the read-for-control process is only performed only if there is a real need, i.e., if polarity reversals must really be read-for-control by the character handling unit. Hence, the line termination unit LE transfers to the character handling unit ZE over the cross-connection QV a read-for-control signals MLS, whenever the line termination unit LE received a polarity reversal. If these two conditions are fulfilled, the storage word SPW read out from the incoming cell in the central storage SP and interpreted as a polarity reversal instruction is received by the read-for-control register MLR of the connector circuit NA.

If a channel location is allocated to the access line, the storage word is entered in the intermediately stored input register PWER. The registration of the input register PWER is checked at the same time to prevent loss of data. This can be done by comparing the two input and output counters PEZ and PAZ. As long as the counter positions thereof do not match, the input register is still capable of reception, and the information about the polarity reversal is entered together with the line numbering identifying the relevant access line. At the same time, the counter position of the input counter PEZ is increased by 1 and a read marking bit is set (L=1). However, if the counter positions of the two counters agree, and, in addition, the read marking bit is also set (L=1), the reception cannot take place. In this case, an error message FM is relayed. After entry in the input register PWER, the activity of the connector circuit NA is terminated. The further handling is taken over by the control section USt, which is informed on the presence of a unit of information in the input register by means of the set read marking bit (L=1).

The transmission of polarity reversals by the character handling unit always proceeds from the control section USt which, to that end, enters polarity reversal messages in the output register PWAR, whereby at the same time the transmission marking bit A is set (A=1). The polarity reversal messages of the line termination unit LE are offered from there over the cross-connection QV. Since the polarity reversal messages are completed according to schedule by the line termination unit, it is not necessary to construct the output register as a multistage intermediate storage. The connector NA establishes a connection to the line termination unit whenever the corresponding transmission marking bit A is set (A=1). A request is thereupon transferred to the line termination unit LT by the character handling unit ZE for receiving a queuing polarity reversal message. The line termination unit acknowledges the reception with the signal LEQ over the cross-connection QV. Thereupon, the character handling unit resets the transmission marking bit (A=0).

The actual character handling is executed by the control section USt, whose operating sequences are, for example, controlled by a wired program. The bits of information and data held in the registers of the connector NA and those retained in the channel locations of the channel storage KAS are offered to the control section USt.

Figure 7:
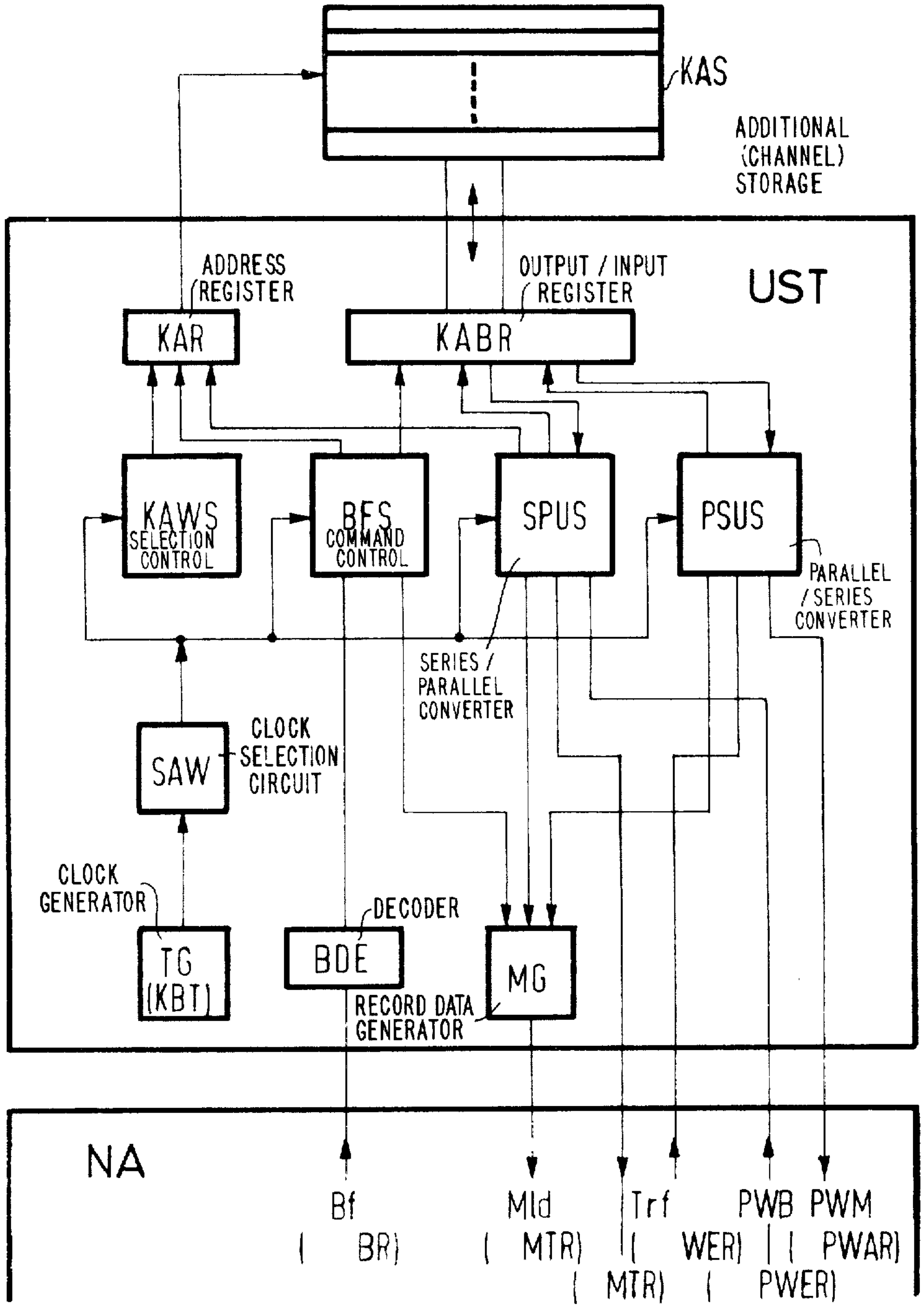
FIG. 7 is a block-schematic diagram illustrating in more detail the construction of the character handling unit described in connection with FIG. 2.

FIG. 7 illustrates a preferred embodiment of the control section USt. Included in the control section of a channel location selection control KAWS, an instruction execution BFS, which is merely made up of a register and gating circuits as needed, a series/parallel converter control SPUS and a parallel/series converter PSUS. The channel locations KZ1 to KZn in the channel storage KAS are capable of being controlled over a channel storage address register KAR, the content of which is thereafter transferred to a channel location processing register KABR for processing. After a processing task, the content of the channel location processing register KABR, which is simply a binary register, is retransferred to the relevant channel location. The control section USt further comprises a conventional clock generator TG which supplies its own channel location processing clock pulse KBT. The coordination of the individual control circuits takes place over a control selection circuit SAW. An instruction decoder BDE is provided for decoding the instructions taken over from the instruction register BR of the connector NA, and a record generator MG is provided for writing messages into the record and transfer register MTR of the connector NA. Both the instruction decoder BDE and the record generator MG are each constructed as gate circuits, in which a binary decoding or coding takes place.

As described hereinabove, the units of information to be transmitted are polarity reversals to be transmitted in the form of polarity reversal messages, units of transfer information to be transmitted and messages to be transmitted, which are loaded from a specified channel location into the output register PWAR or into the register MTR. The units of information to be received are units of transfer information, units of instruction information and polarity reversals received into the register MTR. The units of information to be units of information are available in the word input register WER, in the instruction register BR and in the input register PWER.

Two main tasks are performed by the control section USt, the first consisting in the selection of the channel locations for a character conversion (channel location selection), while the second comprise the actual processing of the channel locations.

The selection of the channel locations, triggered by the clock pulse KBT, runs in cycles, whereby, however, specified areas of the channel storage KAS, which are allocated to lines of a higher rate, are selected at correspondingly shorter time intervals. To achieve this purpose, the address of the selected channel location is offered over the channel location address register KAR. The clock pulse is selected such that at intervals between two clock pulses all the processing operations relating to the selected channel location, as well as all other operations which are current at this instant and which do not affect the currently selected channel locations, can be processed.

The coordination of the individual controls is taken over by the control selection circuit SAW. Thus, with each clock pulse KBT the channel location selection control KAWS is activated to produce the address of the next channel location queuing for processing. During the processing of the selected location, the control selection circuit SAW activates the controls needed for processing the currently queuing channel location. If, for example, it is a receiving channel location, the converter SPUS is activated; in the case of a transmitting channel location, the converter PSUS is activated. After the cyclic processing of a channel location by the pulse KBT, the selection control circuit SAW determines whether a task is to be performed for any other channel. If an instruction is to be executed for a channel, the control BFS is activated. If a polarity reversal instruction is to be entered, the control PSUS is activated. Since the two converters SPUS and PSUS can select channel locations independently of the channel control KAWS, they have their own inputs to the channel selection KAR.

The channel location selection will be described in detail hereinbelow. The channel storage KAS containing the channel locations may be divided into various areas, with each of these areas, for example, containing channel locations having identical conversion rates. The limits of these areas can, for example, by changed by the program control unit by means of corresponding instructions.

The channel location selection control KAWS is so designed that channel locations lying in the area for comparatively high modulation rates are correspondingly selected more frequently than those lying in areas for comparatively low modulation rates.

Figure 8:
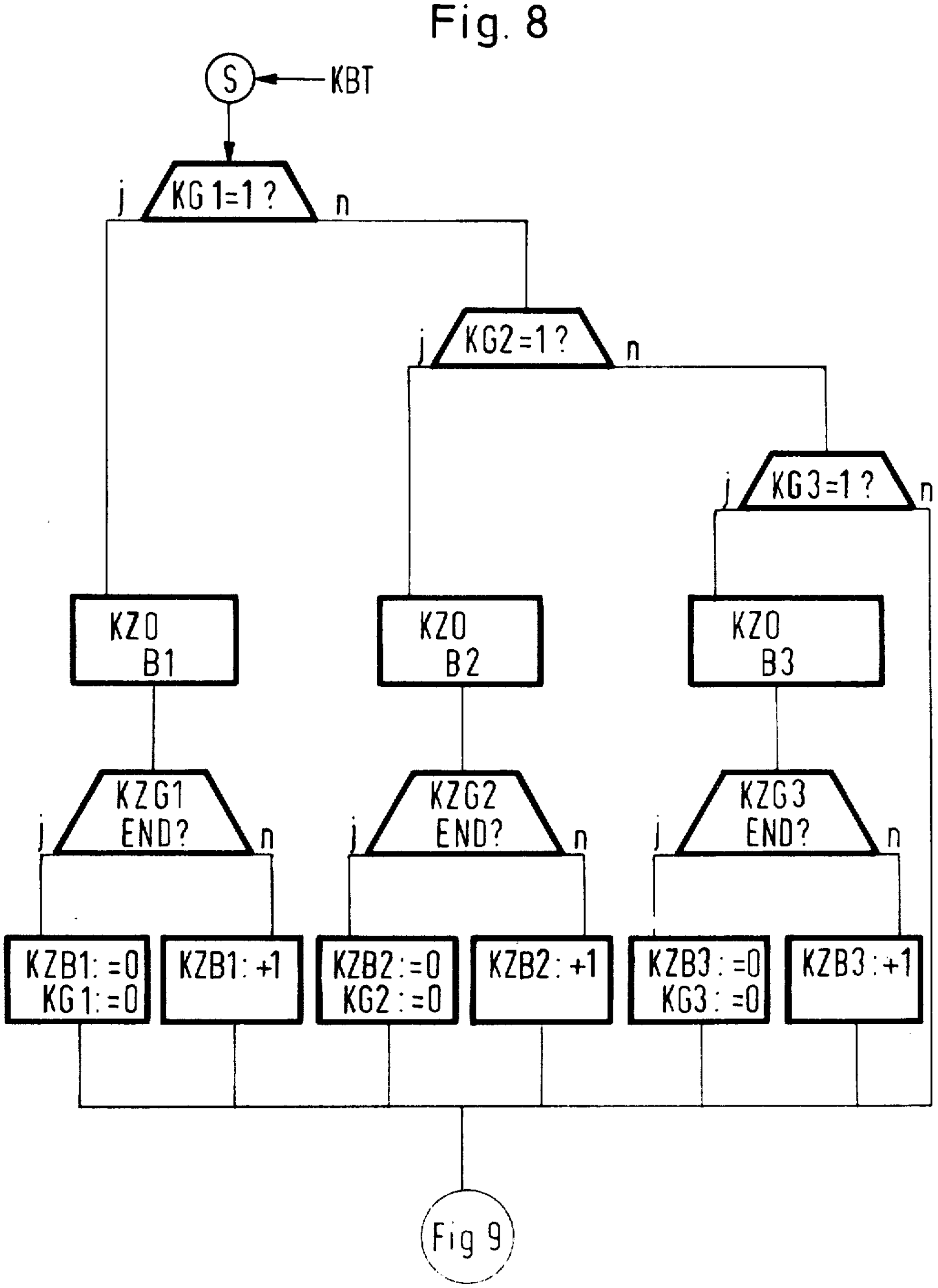
FIGS. 8 and 9 are related flow charts illustrating the operations of the character handling unit described in connection with FIGS. 2 and 7.

Under the requisite condition being considered in the example, wherein three modulation rates are applied to the access lines, the channel location selection will be explained hereinbelow with reference to the flow diagram of FIG. 8.

In this case, the channel storage KAS is divided into three areas B1, B2 and B3. To each area is allocated in the channel selection control KAWS a flip-flop circuit (KG1, KG2, KG3) set at the frequency of the modulation rate of the corresponding area. In addition, a channel counter (KZB1, KZB2 and KZB3) a conventional binary counter is allocated to each of the various speed ranges for addressing purposes. Each of the channel location counters indicates which channel location within a speed range is to be selected as the next location. Finally, each speed range has a programmable variable speed range limiting register (KZG1, KZG2, KZG3), which indicates the address of the upper limit of the area in question in the form of an end mark.

After the channel location selection is triggered, by means of the centrally produced cyclic processing rate KBT, a channel location is selected, whereby the channel locations arranged in storage areas for comparatively high speeds are correspondingly selected and interrogated more frequently. In FIG. 8, this idea is expressed in that a storage area is processed only if the flip-flop circuit KG1 to KG3, allocated to a channel storage area B1 to B3, is set with a 1 (KG=1; KG2=1; KG3=1). If, for example, the storage are B1 is queued for processing (KG=1), then the first channel is addressed, i.e., it is selected by the channel location counter KZB1, whose position is presumed to be 0 (KZB1=0). If the end mark END has not yet been reached, the channel location counter KZB1 is increased by 1 and the processing of this channel location is initiated. Otherwise, the channel location counter and the corresponding flip-flop circuit 0 are set. (KZB1=0). If one of the flip-flop circuits (KG1, KG2, KG3) is set without being reset previously, it means that there is a new order for the selection of a speed range before the block in question is fully completed. Since this is not premissible, a fault signal is delivered.

Figure 9:
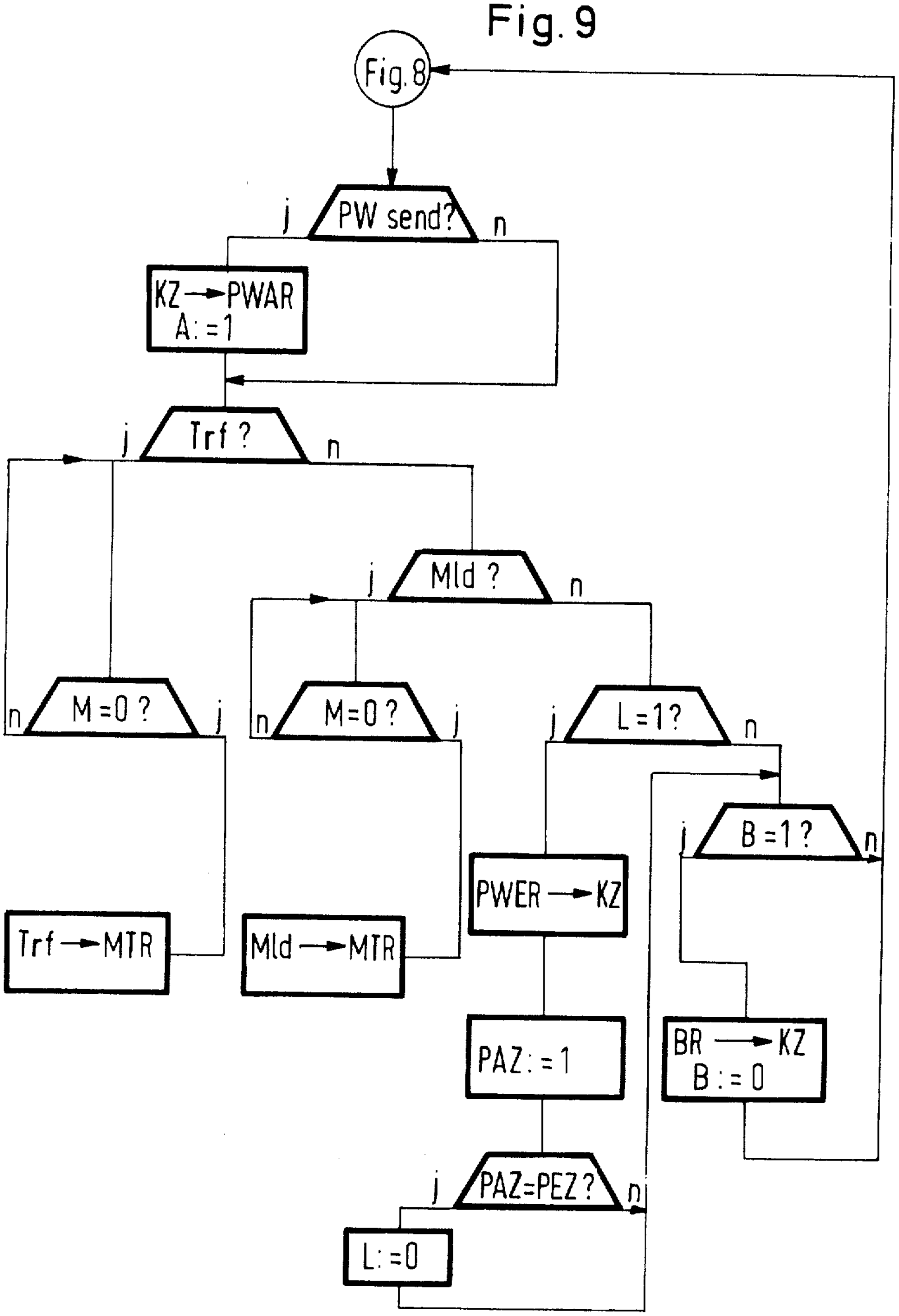

The actual processing of a channel location takes place immediately after the selection thereof. Reference is made to FIG. 9. On the basis of the content of the selected channel location of the storage area B1, a subsequent operation runs as a polarity reversal transmission (PW send), a transfer process (Trf) or a message output (Mld). In the first instance, the polarity reversal signal held in the channel location is transferred to the output register PWAR, and at the same time, a transmission marking bit is set (A=1). The transfer of this polarity reversal signal then occurs independently by means of the connector NA in accordance with the operating sequence shown in FIG. 6.

In the second case, after it has been determined that the record transfer register MTR is free (M=0), the transfer information signal Trf is sent to the register MTR, and at the same time, the transfer marking bit T is set (T=1). In the course of a transfer cycle (Tzy in FIG. 4), the transferred information is accepted by the common storage SP, and the transfer marking bit T is erased. During the reception of a character in the form of transfer information by the channel location, it is available in the word input register WER of the conlector A, and can be coupled to the channel location n question. In the third instance, if there is a message o be transmitted, after it has been determined that the ecord transfer register MTR is free (M=0), a correponding message is entered in the register MTR, the ecord bit M is set (M=1) and the record cycle (Mzy n FIG. 4) is processed independently by the connector :ircuit NA.

If the selected channel is a transmitting channel, i.e., f a parallel/series conversion takes place, a polarity re'ersal can be transmitted directly, since the channel lo:ations are selected according to their modulation ates. A decision can be made whether the polarity has ictually changed at the time of processing by comparng the polarity last transmitted and stored in the chanıel location with the polarity currently applied to the ransmission. This task is taken over by the parallel/seres conversion control PSUS of the control section USt.

If the selected channel is a receiving channel, in other vords, if a series/parallel conversion takes place, it is ıf advantage to execute a time-comparison process. To lo this, the positions, within the character, of polarity eversal instructions are established in the series/parallel converter control SPUS of the control section USt vith relation to the difference in the times of arrival hereof.

The time-comparison process is carried out such that ncoming polarity reversals are entered in the correponding channel locations together with the times of heir arrivals. If a received channel location is selected ın the basis of the cyclic processing, the time of arrival ıf the last polarity reversal instruction is compared vith the instant time, and the character is composed herefrom.

Character transfer and/or message processed can be ıbtained from the character conversion in a selected hannel location. Character transfers can result whenver a character is fully formed in a received channel nd is to be received by the common storage SP. These ırocesses are performed by the series/parallel con'erter control SPUS of the control section USt.

In the case of transmitting channels, character transers can result if a character has been sent out and a ıew character is to be allocated for transmission. In this ase, a new character is received by means of a transfer ycle from the common storage SP, by the word input egister WER of the connector NA, and from there acepted directly by the channel location in question over he channel processing register KABR under the conrol of the parallel/series converter control PSUS of the ontrol section Ust.

Aside from the transfer cycles referenced hereinbove, message cycles can also be obtained as a result ıf the cyclic processing of channel locations, for examıle, if the character handling unit wants to inform the ırogram control unit that a character is received or ransmitted. In the case of a series/parallel converter, he character handling unit transfers the character itelf to the common storage using the character recepion message.

The above processing involving output of polarity reersal messages, execution of character transfers, and onversion-dependent readout of messages are proesses which result from the internal cyclic processing f channel locations. In addition, operating sequences ıust be performed which do not relate to the currently elected channel location. Such processes, which are triggered externally, are the reception of polarity reversal instructions and the arrival and processing of instructions originating with the program control unit PE. These processes, too, are shown in FIG. 9. For a description thereof, please refer to FIG. 3.

If, for the formation of a character in parallel bit representation, a polarity reversal is to be entered in the channel location, i.e., if there is a polarity reversal instruction, the read marking bit L is set in the connector NA, and the polarity reversal instruction is held in the input register PEWR. This information is entered in the corresponding channel location. At the same time, the output counter PAZ is advanced by 1. Subsequently, it is verified whether the registration conditions of the input and output counters PEZ and PAZ are in agreement. If so, there is no further polarity reversal instruction and the read marking bit L is reset (L=0).

The operating sequence for accepting an instruction from the instruction marking bit B is set (B=1). In this case, the instruction is received from the instruction register BR by the converter control USt and executed. The conversion control USt then resets the instruction marking bit B (B=0). For example, a character location can be loaded with such an instruction, and thus contains all instruction data required for the character conversions accumulating during the allocation. After these processes have been completed, the operating sequence shown in FIG. 8 is restarted upon arrival of the next clock pulse KBT.

All processes in the character handling unit described with reference to FIGS. 8 and 9, whether they are caused internally or externally, are processed in the frequency of the common processing clock pulse KBT. The period of this clock pulse is selected such that, as a rule, the operations can each be processed within a clock pulse period. To do this, they are so distributed over the clock pulse period that normally a channel location is selected with the clock pulse initiation point and when the operations necessary for this channel location are proceeding (internal operations of the character handling unit). Immediately thereafter, but still within the clock pulse period, it is verified whether, aside from the selected channel location, another channel location is to be operated upon by virtue of external requests for the character handling unit.

Although, as a rule, the interval between two processing pulses KBT is sufficient for a timely processing of all the operations described hereinabove, this is not always ensured if a character transfer is to be executed. An example of such situation in when the storage cycles required in the common storage SP for executing the character transfer cannot be processed in time. Such delays can be detected by a time-lag counter, whose registration increased whenever during the processing of a channel location a new processing pulse arrives. This time-lag counter is designed such that a fault signal is transmitted if a predetermined overflow value is exceeded. If the time-lag counter is not equal to zero and the control section terminates the processing of a channel location before a new processing pulse has arrived, a new channel location processing is initiated immediately. The registration of the time-lag counter is then lowered by 1.

When describing the series/parallel conversion, reference was made to a method which might be called the time-comparsion method. However, it must be stated that the series/parallel conversion can also be carried out according to the principle of what might be called pulse sampling, wherein, however, access must be gained to the common storage at the expected pulse center. In this case, starting from the leading edge of the start pulse of a signal, each time at the expected pulse center of the signal, the position of the incoming cell in the common storage allocated to the receiving access line is taken over. The channel locations are connected to a common clock pulse. Moreover, a step counter is allocated to each channel location. Furthermore, a ringing time dependent upon the receiving speed is entered at the start of a polarity reversal reception. With the arrival of the start pulse of a signal, the step counter is set to zero. The next sampling instant is entered as a ringing time in the channel location. If this instant is attained, the polarity of the incoming cell is received in the course of transfer of the content of the incoming cell, the step counter is increased by 1, and the ringing time is entered. This process is repeated unitl the end of the signal is recognized from the registration of the step counter. In this case, too, the signal is found in parallel form in the channel location.

To execute the operations described hereinabove, it has been assumed that directly addressable storages such as core or semiconductor storages are used as channel storages. However, the invention is not limited to directly addressable storages, but cyclic storages, such as delay line storages. Cyclic storages offer the advantage that the processing pulse of a channel location can be derived from the circulation time. This is particularly the case when sending support signals, since the signals are sent free of distortions. Counters can be made for each channel location with comparatively little expenditure. These counters are controlled by the circulation of the channel location and, by means of which, the transmitting instants are determined.

Figure 10:
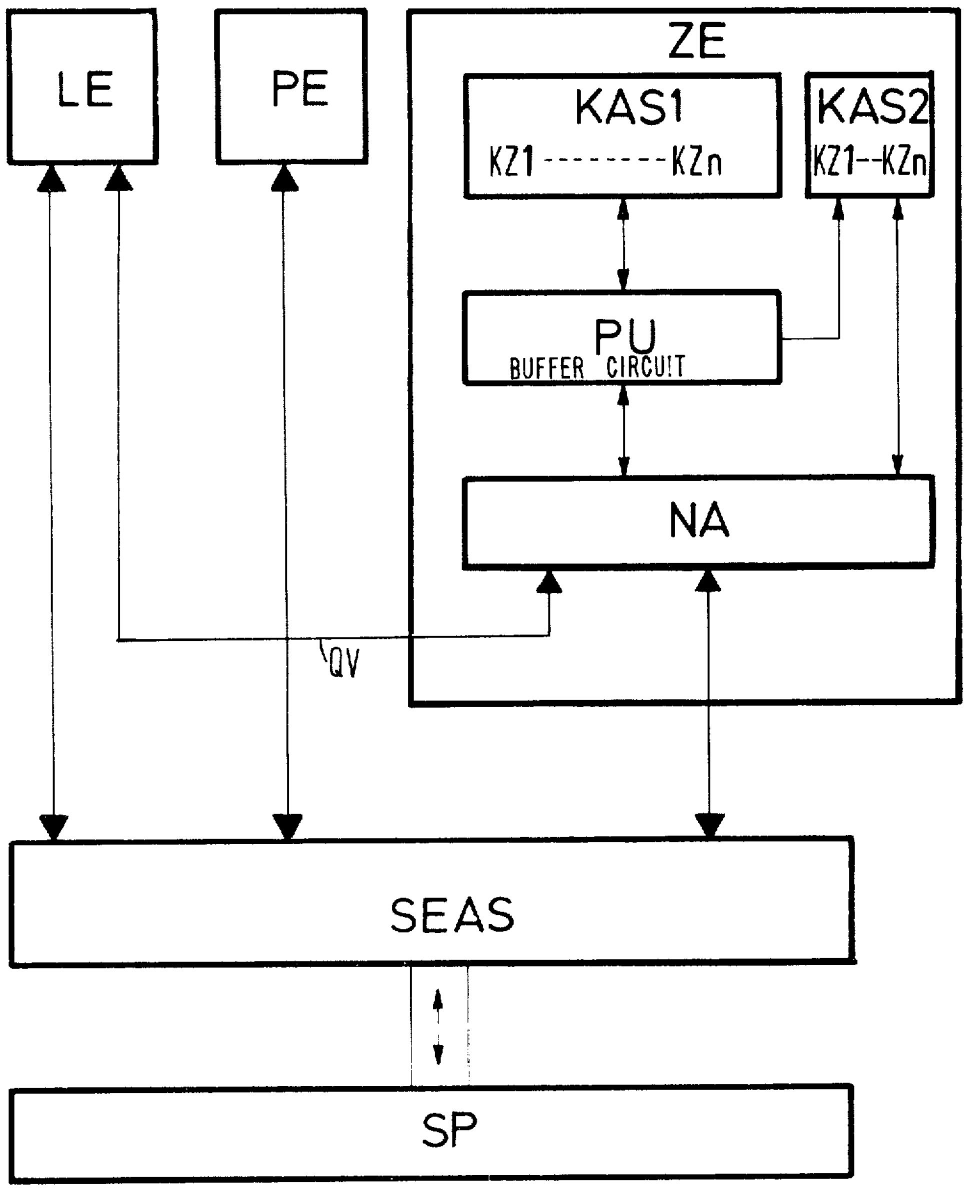
FIG. 10 is a block-schematic diagram illustrating an alternate embodiment of the character handling unit.

A preferred embodiment in which cyclic storages are employed is shown in FIG. 10. Compared with the circuit illustrated in FIG. 2, the arrangement of FIG. 10 contains, moreover, a buffer PU as well as two channel storage areas KAS1 and KAS2. The connector NA, over which the traffic between the character handling unit ZE and the common storage SP is regulated, corresponds in construction to the connector shown in FIG. 3. The buffer PU between the connector NA and the channel storage area necessary, because with this type of construction acccess cannot always be gained to the channel storage. However, the connector communicates at any instant of time with the common storage. The channel locations KA, provided for slow speeds, e.g., up to 200 bauds, are combined in a first channel storage area, and the channel locations provided for high speeds, e.g. up to 2.4 kilobauds, are combined in a second channel storage area. The first storage area may, for example, be a delay line storage, the second storage area a shift register. Each storage area comprises a storage section and a control section.

The functioning of the character handling unit shown in FIG. 10, particularly its interoperation with the other processing units of the system, is essentially the same as that which was described with reference to FIG. 2. Thus, instructions for executing signal conversions from the program control unit are entered in the instruction area BB, and messages from the character handling unit are entered in the record area MB of the common storage.

An essential component of the character handling units, constructed according to the above principles, is the buffer PU, which receives instructions read out by the connector NA from the common storage SP at any instant of time.

If, as proposed hereinabove, a delay line storage is employed for the slow channel storage area KAS1, then an intermediate buffering is also needed for reading out messages and transfer data. If a shift register storage is used in which, as is well known, the shifting process for communication purposes can be interrupted, then no intermediate buffering is necessary for the output of data (i.e., for reading out messages and transfer data). Data which are read out from this channel storage area, as illustrated in FIG. 8, may be transferred directly to the connector NA.

The buffer PU comprises a series of locations, e.g. 16, in which a bit indicates the busy/idle condition of the location. It is of advantage to receive the addresses of idle buffer locations in a separate register, so that idle locations can easily be reached. Moreover, a buffer location contains a series of direction bits which indicate for which other units of the character handling unit the content of a buffer location is intended. The direction bits are so selected that the content of a buffer location is first offered to the rapid channel storage area KAS2.

In the practical example, the rapid channel is a shift register storage. The acceptance of instructions from the buffer PU by the rapid channel storage area occurs during an instruction processing operation, in the course of which it is verified whether the data offered are, in fact, indended for the rapid channel storage area. This can, for example, be shown on the basis of the line number contained in the instruction word. If the rapid channel storage area contains a channel location in which this line number is entered, the instruction is accepted and the content of the buffer location in question is erased. Otherwise, the content is written back into the buffer location, whereby the direction bits are at the same time altered such that the content is presently offered to the slow channel storage area. The processing of the individual channel locations of the rapid channel storage area takes place in the course of a second operating sequence. This may take place, for the reception, after the time-comparison method described hereinabove or after the pulse sampling method and, for the transmission, by adjusting a ringing time and a step counter.

In this way, during the reception, a parallel bit signal is formed step by step or, during the transmission, a parallel bit signal is transmitted serially. If, during a conversion process, a signal transfer is to take place, due to the quality of a shift register storage the operating sequence can be stopped unitl a transfer cycle has been performed. To prevent excessive distortions, the period between request and allocation of a transfer cycle is monitored, which takes place in the manner described with reference to FIG. 4.

In the course of a channel location processing of the slow storage area, the entire content of the buffer PU is offered thereto, insofar as it is intended for the slow channel storage area. What data are pertinent for a channel location of the slower storage area to be processed currently through the cyclic selection procedure is decided by the control section thereof. If the decision positive, the information is accepted and the buffer ıcation erased.

Messages and transfer data originating with the slow ıannel storage area are always entered in free locaons of the buffer PU and from there received by the ɔnnector NA. An executed transfer procedure, i.e., ıe takeover of a signal from the common storage, is ansferred immediately thereto, if the corresponding ıannel location is still being operated upon. If the proɛssing of this channel location has already been comleted, the transfer information, in the same way as an ıstruction, is entered in a free location of the buffer, ıd is offered sufficiently long to all channel locations ith the following channel location processings unit the ıannel location in question is again operated upon to .ke over the transferred signal.

It is of advantage to monitor the period of the seizure f a buffer location, to automatically release this locaon after a specified holding time is exceeded, and to ansmit a fault message.

The principles of this invention have been described ɛreinabove by describing examplary embodiments ɔnstructed according to those principles and capable f performing the method of the invention. It is anticiıated that the described embodiments, or the processes ırried out by them, can be changed or modified withıt departing from the spirit or scope of the invention, ; defined by the appended claims.

We claim:

1. In a program controlled data exchange installation ıving at least one central store for data and programs ır operating said installation and processing units in·roperating with said central store in cycles, at least ne of said processing units being a program controlled ıit and at least one of said processing units being a ıe connection unit, said central store including a ·eder block having a plurality of feeder cells, each of ıid feeder cells being assigned to a line connected to ıid line connection unit, said central store including in ddition a command block for storing instructions, a ·cord block for storing record information and a ansfer block for storing characters, a method for anslating data characters comprising the steps of:

initiation of a character translation operation by said program control unit, allocation, in reponse to said initiation step, of at least one of a plurality of storage cells in an additional store within a data handling unit for the duration of the character translation operation, by entering therein the number of a line being connected to said line connection unit and accessing said command block in said central store by said data handling unit for the transfer of commands into said additional store in the course of a storage cycle operating as a command cycle.

accessing said record block in said central store by said data handling unit for the transfer of record data in the course of a storage cycle operating as a record cycle, accessing said transfer block in said central store for the transfer of data, character by character, in the course of an operating cycle of said central store, which operating cycle is running as a transfer cycle, forming addresses for said command block and said record block by permanently wiring block addresses, forming addresses for storage cells within said command block from a registration of a command counter, forming an address for said transfer block responsive to an allocation of a said line to said storage area in said additional storage and preventing the processing of other cycles until the data transfer has been completed and executing a command cycle in the course of which a command is written in a command register and a record cycle in the course of which a transfer message is written into a transfer register.

2. The method defined in claim 1 comprising the further steps of:

communicating the idle condition of said storage cells in said additional store to said central store, determining an idle additional storage cell and responsive to the determination of said idle additional storage cell entering the number of said line being connected to said line connection unit and the instructions required for execution of a character translation operation into said idle additional storage cell.

3. The method defined in claim 1 comprising the further steps of:

searching through said additional store in order to locate an idle storage cell and entering during an instruction cycle, into said idle storage cell, so located, the number of said line being connected to said line connection unit and the instructions for a character translation operation.

4. The method defined in claim 1 comprising the further steps of:

generating processing pulses within data handling unit, said storage cells in said additional storage being selected in cycles in accordance with the pulses rate of said processing pulse, adjusting the pulses rate of said processing pulse corresponding to the one of said storage areas associated therewith during a first interval, such that during a second interval all operating sequences required for the reception of instructions by said one additional storage area and all operating sequences related to the other storage areas of said additional storage are capable of being executed.

5. The method defined in claim 4 comprising the additional step of:

generating a fault signal upon the arrival of a said processing pulses during the processing of the contents of a storage cell in said additional storage.

6. The method defined in claim 1, wherein said additional store is a directly addressable store and comprising the additional steps of:

allocating individual storage areas in said additional store, each of which includes a number of storage cells, respectively, to access lines having like data transmission rates and characterizing the limits of the storage areas by either end marking bits or a predetermined registration of a counter means.

7. The method defined in claim 1 wherein said additional store is a circulating store, comprising the additional step of:

intermediately storing instructions, messages or data being transferred to or from said common storage in a buffer storage.

8. In a program controlled data exchange installation having at least one central store containing the data and programs necessary for operating said installation and processing units interoperating with said common storage in a cyclic manner, at least one of said processing units being a program control unit and at least one of said processing units being a line termination unit, the improvement comprising:

character handling means including connector circuit means for regulating traffic with said common storage, control means for determining tasks to be performed and channel storage means divided into storage areas, each containing a plurality of storage locations, means for selective allocating at least a said storage location, upon initiation of a character translation operation by said program control unit, for the duration of said operation, by entering a line number corresponding to a demanding access line and means for cyclically accessing said common storage by said channel storage means for transfer of messages and data to said common storage and for transfer of instructions and data to said channel storage means.

* * * * *